Dec. 30, 1958   N. KEITH   2,866,665
WHEEL LOCK

Filed Jan. 28, 1957   2 Sheets-Sheet 1

INVENTOR.
NOEL KEITH

Dec. 30, 1958 N. KEITH 2,866,665
WHEEL LOCK
Filed Jan. 28, 1957 2 Sheets-Sheet 2

INVENTOR.
NOEL KEITH

United States Patent Office 2,866,665
Patented Dec. 30, 1958

2,866,665

WHEEL LOCK

Noel Keith, Barnabus, W. Va.

Application January 28, 1957, Serial No. 636,556

3 Claims. (Cl. 301—9)

This invention relates to fastening devices and more particularly to means for removably securing wheels to the axle drum of vehicles.

It is an object of the present invention to provide a wheel securing device having operating means for simultaneously engaging all of the fastening lugs of an axle drum in response to actuation thereof between a released and engaged position.

It is another object of the present invention to provide a wheel fastening device of the above type wherein an annular base plate is provided with a plurality of sleeves for slideably engaging each of the fastening lugs of an axle drum and which has releasable gripping means associated therewith for securely engaging the lugs.

Other objects of the invention are to provide a wheel fastening device bearing the above objects in mind which is of simple construction, has a minimum number of parts, is inexpensive to manufacture and efficient in operation.

For other objects and for a better understanding of the invention, reference may be had to the following detailed description taken in connection with the accompanying drawing, in which.

Figure 1:
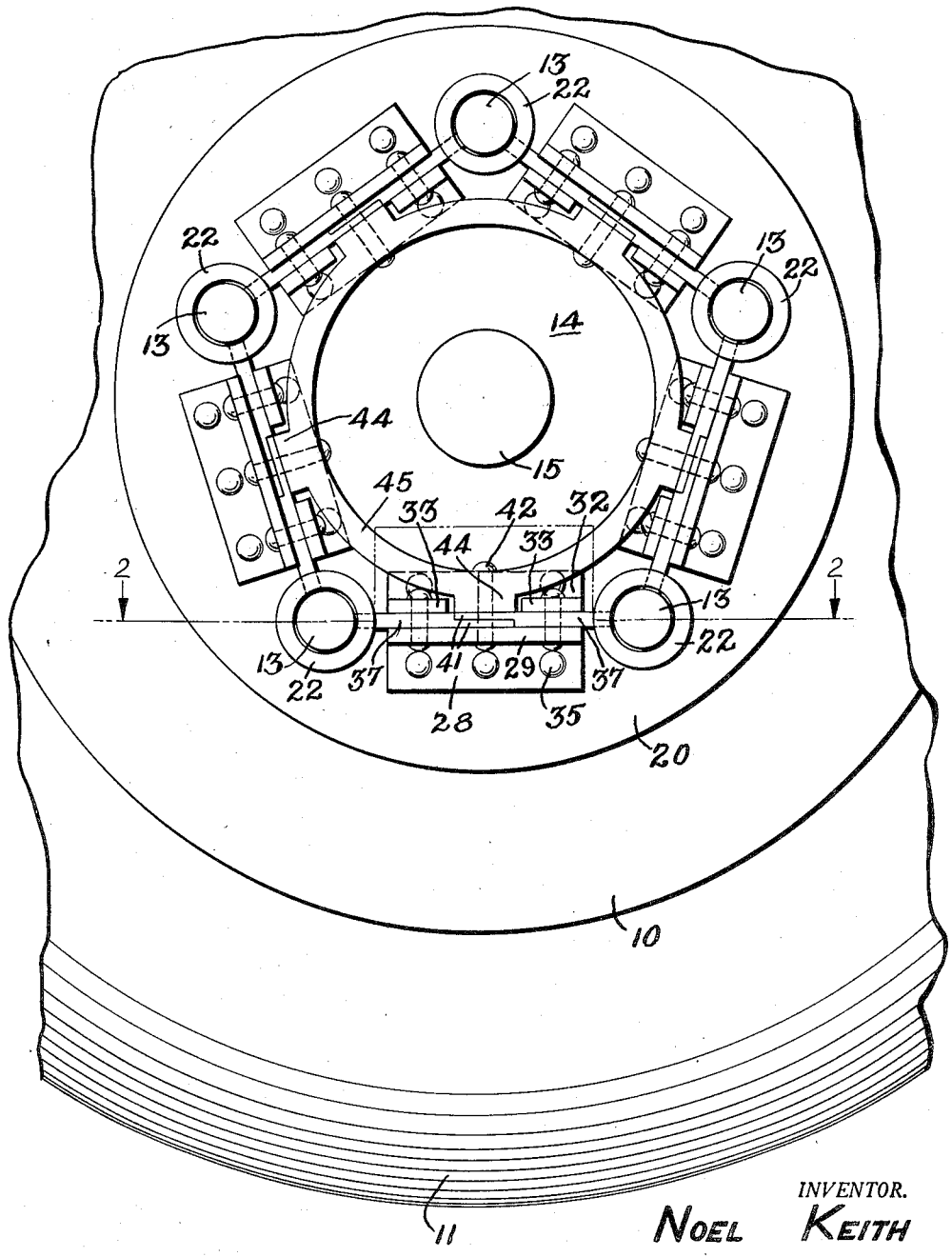
Figure 1 is a side elevational view of a vehicle wheel embodying a fastening device made in accordance with the present invention.

Referring now more in detail to the drawing, and more particularly to Figure 1 thereof, a vehicle wheel 10 of the type adapted to removably support a pneumatic tire 11, is shown secured to the drum 14 of an axle 15 by means of substantially rigid lugs 13.

Figure 2:
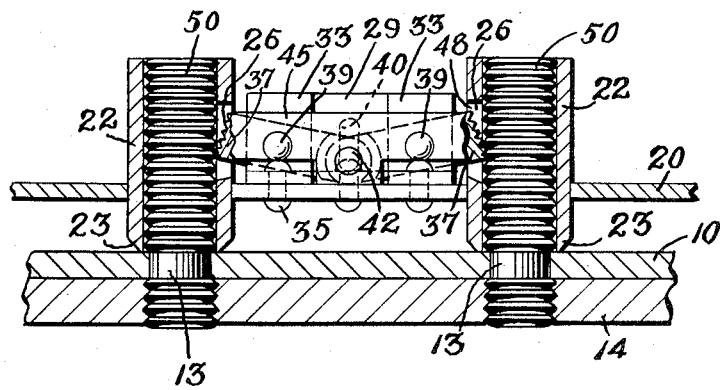
Figure 2 is an enlarged fragmentary longitudinal cross sectional view taken along line 2—2 of Figure 1, showing the parts in a locked position.
Figure 3:
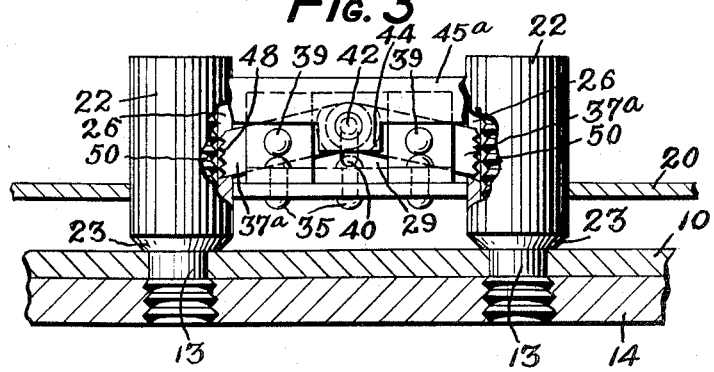
Figure 3 is a view similar to Figure 2, showing the parts in a released position.

As is more clearly shown in Figure 2, the locking device includes an annular base plate 20 that has a corresponding number of sleeves 22 extending therethrough for slideable engagement with each of the fastening lugs 13. The tapered wheel side 23 of each of the sleeves 22 is adapted to be placed in abutting engagement with the wheel 10 so as to secure it in engagement with the drum 14. The opposite side of each sleeve is provided with a pair of circumferentially spaced apart longitudinally slots 26, for purposes hereinafter described.

A guide device is disposed between each of the sleeves 22. Each guide device includes an angle bracket 28 having a perpendicularly extending web 29 that defines a guide slot with a pair of longitudinally spaced perpendicular webs 33 of a similar angle bracket 32, each of which brackets are rigidly secured to the annular base plate 20, such as by rivets 35. A pair of lug bolt grippers 37 are slideably received between the webs 29, 33 and are pivotally connected adjacent their mid-sections by pivot pins 39 that are secured to the opposed webs. The continuous web 29 is provided with a slot 40 that extends parallel to the axis of the sleeves 22. A hinge or pivot pin 42 pivotally connects the adjacent ends 41 of the grippers 37 together and extends into the slot 40 so as to be guided for movement therein. An operating ring 45 of annular configuration, is provided with a plurality of radially outwardly and perpendiculralry downwardly extending bosses 44, each of which has one of the pivot pins 42 integrally connected thereto.

Referring to Figure 2, it will be noted that with the parts in an operative engaged position, the serrated portion 48 at each end of the grippers 37 extends through the longitudinal slot 26 in the adjacent sleeve 22 and into gripping engagement with the threads 50 of the lugs 13. By prying the operating ring 45 in a direction outwardly and away from the base plate 20, each pair of grippers 37 is pivoted about the respective pivot pin 39 to the release position 37a, whereupon the serrated portions 48 disengage the threads 50. In the released position, the device may be lifted outwardly of the wheel and slideably disengaged from the lugs 13, whereupon the wheel may be disassembled from the axle. To replace the fastening device, it is only necessary to slide the sleeves over the associated lugs and then urge the operating ring 45a in a direction towards the base plate 20, whereupon the disengaged grippers 37a are returned to the engaged position 37 to securely hold the related parts together. The space between the operating ring 45 and the base plate 20 provides means for prying the elements apart, such as with a screw driver.

While various changes may be made in the detail construction, it shall be understood that such changes shall be within the spirit and scope of the present invention as defined by the appended claims.

What I claim as new and desire to protect by Letters Patent of the United States is:

1. A device for securing the hub of a wheel to an axle of a vehicle in which the drum has a plurality of outwardly extending securement lugs comprising, in combination, an annular base plate, a plurality of sleeves extending perpendicularly through said base plate each adapted to slidably receive a securement lug of the axle drum, and gripping means associated with each said sleeve for releasably engaging the lug received within said sleeve, said gripping means comprising guide means disposed between adjacent ones of said sleeves, and a pair of lug bolt grippers pivotally secured intermediate the ends thereof upon said guide means hingedly connected together at one end, the opposite end of each of said grippers adapted to extend through the adjacent lug into retractable engagement with an associated lug, and selectively actuated operating means for moving said grippers between an engaged and disengaged relationship with said associated lugs, each of said sleeves being provided with a slot at opposite sides for slidably receiving the gripper associated with said guide means at each side thereof, said operating means comprising an annular ring having an enlarged boss disposed in proximity with each of said guide means, each said boss having a pivot pin for hingedly connecting the adjacent ends of said grippers, whereby movement of said annular ring in a direction perpendicular to the plane of said base plate is operative to effect simultaneous movement of all of said grippers.

2. The combination according to claim 1, wherein said guide means comprises a pair of spaced webs secured to said base plate and extending perpendicularly thereto, said webs defining a space therebetween for slideably receiving a pair of said grippers.

3. The combination according to claim 2, wherein each of said grippers includes a serrated portion adapted to positively engage the threads of an associated lug when moved to said engaged position, said serrated portion being adapted to release said lug in response to movement to said disengaged position.

References Cited in the file of this patent

UNITED STATES PATENTS 2,726,900     Stanetzki _____ Dec. 13, 1955

FOREIGN PATENTS 226,281     Great Britain _____ Dec. 19, 1924